United States Patent [19]

Seidel

[11] 4,181,824
[45] Jan. 1, 1980

[54] BALANCING IMPEDANCE CIRCUIT

[75] Inventor: Harold Seidel, Warren, N.J.

[73] Assignee: Bell Telephone Laboratories, Incorporated, Murray Hill, N.J.

[21] Appl. No.: 949,576

[22] Filed: Oct. 10, 1978

[51] Int. Cl.² ............................................. H04B 3/40
[52] U.S. Cl. ......................... 179/170 D; 179/170 NC
[58] Field of Search .......... 179/170 R, 170 G, 170 D, 179/170 NC; 328/160; 333/17 M

[56] References Cited

U.S. PATENT DOCUMENTS

| | | | |
|---|---|---|---|
| 3,530,260 | 9/1970 | Gaunt | 179/170 R |
| 3,778,563 | 12/1973 | Bise et al. | 179/170 R |
| 3,855,430 | 12/1974 | Colardelle et al. | 179/170 NC |
| 3,860,767 | 1/1975 | Boucher et al. | 179/170 G |
| 3,919,502 | 11/1975 | Daryanani | 179/170 D |
| 3,970,805 | 7/1976 | Thomas | 179/170 NC |
| 3,973,089 | 8/1976 | Puckette | 179/170 NC |
| 4,004,102 | 1/1977 | Ott | 179/170 R |
| 4,004,109 | 1/1977 | Boxall | 179/170 NC |
| 4,064,377 | 12/1977 | Regan | 179/170 NC |

OTHER PUBLICATIONS

"Novel Active Hybrid Circuit and Its Applications"; Electronic Letters; Vol. 11, No. 16; Aug. 7, 1975; pp. 362-363.
"DSS Quad Line Circuit"; International Symposium on Subscriber Loops and Services; Mar. 24, 1978; pp. 182-184.

Primary Examiner—Bernard Konick
Assistant Examiner—Randall P. Myers
Attorney, Agent, or Firm—Robert O. Nimtz

[57] ABSTRACT

A class of electronic hybrids is disclosed in which the line balancing impedance is made frequency-sensitive in order to better match the frequency characteristic of the connected line and is made voltage-controlled in order that a single network can be used to match a variety of different gauges of telephone cable pairs. The matching impedances are synthesized utilizing RC networks and the voltage control is realized with two-node Miller effect impedance multiplication circuits realized by long-tailed pairs for synthesizing hyperbolic tangent impedance functions under the control of a voltage.

9 Claims, 10 Drawing Figures

BALANCING IMPEDANCE CIRCUIT

BACKGROUND OF THE INVENTION

1. Field of the Invention

This invention relates to bilateral transmission systems and, more particularly, to balancing impedances for adaptive frequency-sensitive active hybrids in such systems.

2. Description of the Prior Art

Hybrid circuits have been used in communications networks where it is necessary to couple a bidirectional 2-wire line to unidirectional sections of a 4-wire line. In a telephone system, for example, bidirectional signals are carried over the 2-wire subscriber loop but must be split into separate transmit and receive unidirectional signals at the central office and at the subscriber terminal. Various forms of hybrid circuits have been developed to achieve this function.

Standard hybrids for analog voice frequency signals utilize multiwinding transformers arranged to couple signals from the transmission port to the 2-wire access port and to couple signals from the 2-wire access port to the receiving port. By balancing the windings, however, signals imposed on the transmission port are canceled at the receiving port. Such hybrid transformers are comparatively large in size, are high in cost and have frequency-dependent transmission characteristics.

To overcome these disadvantages, various forms of transformerless or electronic hybrids have been proposed. In addition to providing the transmission ports described above, such a hybrid must also present to the 2-wire access port an impedance equal to the characteristic impedance of the connected 2-wire line. To a first approximation, this impedance has heretofore been assumed to be a constant, wholly resistive impedance and simple resistors have been utilized to simulate this characteristic impedance. It is clear, however, that the characteristic impedance of any 2-wire line has certain frequency-sensitive variations which, if not taken into account, produce distortions and imbalances in the transmitted signals. These distortions and imbalances can often be ignored when the hybrid circuit is utilized for the transmission of narrowband analog voice signals such as are used in standard telephony. The frequency-sensitive characteristic impedance tends to vary with the gauge of the wires in the telephone loop.

In modern telephone systems, it has become necessary to connect wideband digital data terminals to such telephone loops. The hybrid transformer and resistive electric hybrids have proved unsuitable for the adequate transmission of such broadband digital signals. One such electric hybrid is disclosed in J. F. Regan U.S. Pat. No. 4,064,377, granted Dec. 20, 1977.

SUMMARY OF THE INVENTION

In accordance with the illustrative embodiment of the present invention, an electronic hybrid is provided which includes a frequency-sensitive impedance circuit which closely matches the characteristic impedance of a twisted pair telephone loop over a broad band of frequencies. This characteristic impedance is closely simulated over a broad frequency range by an impedance the magnitude of which is inversely proportional to the square root of frequency in the low frequency range but which is essentially constant in the high frequency range.

In a preferred embodiment of the present invention, the characteristic impedance is realized by a shunt-connected Norton equivalent source. This configuration is not only easier to realize, but has the added advantage of permitting a voltage-controlled adaptation of a fixed impedance network to a plurality of different gauges of conductors in the 2-wire circuit. Each gauge of wire produces a somewhat different low frequency characteristic impedance and thus a single circuit can be used to accommodate all of the various gauges and of wires used in the telephone system.

DETAILED DESCRIPTION

Figure 1:
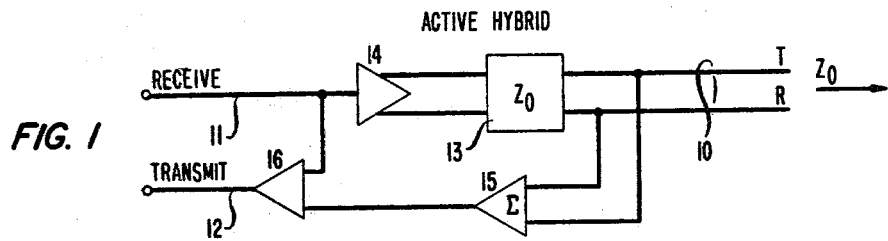
FIG. 1 is a general block diagram of an active hybrid circuit.

In FIG. 1 there is shown a general block diagram of an active hybrid which serves the function of interconnecting a 2-wire bidirectional transmission line 10 to a unidirectional receiving line 11 and a unidirectional transmitting line 12. The active hybrid of FIG. 1 comprises an impedance element 13 which matches the characteristic impedance of transmission line 10 and thus prevents reflections of signals arriving on transmission line 10. The unbalanced unidirectional signal applied to transmission line 11 is converted to a balanced signal by means of amplifier 14, the output of which is applied through characteristic impedance 13 to 2-wire transmission line 10. The signal arriving on transmission line 10 is applied through amplifier 15 to a differential amplifier 16. The signal from line 11 is applied to the other input of differential amplifier 16 and thus transmitted signals are subtracted from the composite bidirectional signal on transmission line 10 in differential amplifier 16. Thus, only the signal delivered via transmission line 10 from a remote signal source is delivered to transmission line 12.

It should be noted that amplifiers 14, 15 and 16 are standard configurations of broadband differential amplifiers as are well known in the art and that the recombinations taking place in amplifiers 15 and 16 are completely insensitive to frequency. Thus, the configuration of FIG. 1 as a whole remains balanced throughout a very broad band of frequencies.

In order for an active hybrid of the form shown in FIG. 1 to be useful for the transmission of broadband digital data, the conjugate arm separations in the hybrid must exceed 50 dB and must do so over a frequency range from zero to hundreds of kHz. At the same time, such a hybrid must create a termination having a very large return loss over the same frequency range and preferably being capable of adapting to the wide variety of cable sizes existing in the telephone plant.

The characteristic impedance of a transmission line, such as a telephone cable, is given by $$Z = \sqrt{\frac{R + i\omega L}{G + i\omega C}} \cdot \quad (1)$$

where R, L, G and C are the per unit length resistance, inductance, conductance, capacitance, respectively, of the transmission cable.

To a first order of approximation, the conductance G is vanishingly small, represented by the leakage of the cable. Modern paper and plastic insulated cable inherently provide such small conductances. If the conductance G is assumed to be 0, equation (1) suggests two dominant regions of different frequency behavior of the characteristic impedance with a transition region therebetween:

$$\omega << R/L, \ (0-20 \text{ kHz}) \quad (a)$$

where the characteristic impedance is essentially inversely proportional to frequency, given by $Z = \sqrt{(R/i\omega C)}$, and $$\omega >> R/L, \ (>100 \text{ kHz}) \quad (b)$$

where the characteristic impedance is essentially a constant, given by $Z = \sqrt{L/C}$. This impedance function is shown in FIG. 2.

To synthesize such a network, it is assumed that a small but finite conductance G is present in order to avoid a singularity at the origin. This introduces an artificial third region shown in FIG. 2 by line 20, where $\omega << G/C$ and where the characteristic impedance is again constant and the conductance G is very small.

Figure 2:
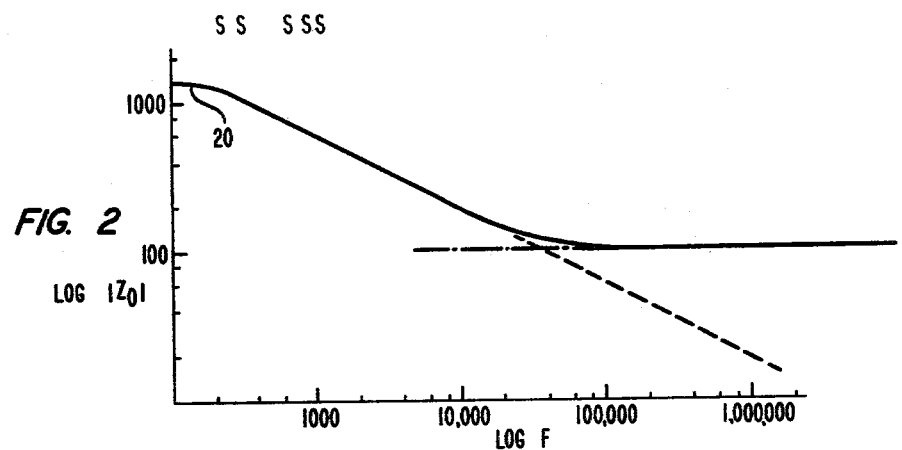
FIG. 2 is a graphical logarithmic representation of the magnitude of the characteristic impedance of a telephone loop versus frequency characteristic.

If the R, L, G and C parameters were truly independent of frequency, the characteristic impedance illustrated in FIG. 2 could be synthesized with a network consisting of only resistive and capacitive elements. These primary per unit length constants, however, do have slight frequency dependencies. These dependencies are sufficiently small for standard telephone cables that they can be ignored for voice frequency or low speed data service. For more exacting service such as, for example, wideband digital signaling, it is necessary to frequency shape these impedances and, moreover, to vary these impedances depending upon the gauge of the connected telephone cable since the low frequency characteristic varies significantly with the gauge of the telephone cable.

Figure 3:
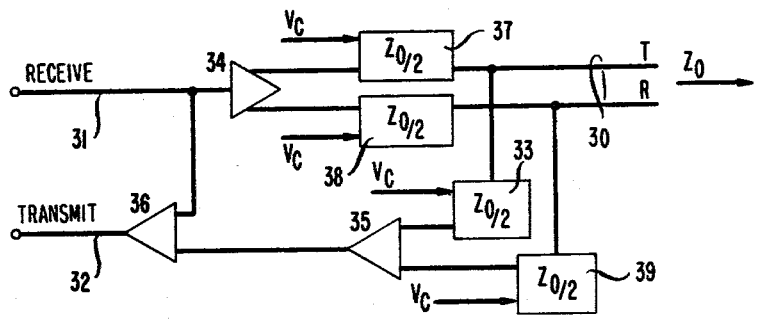
FIG. 3 is a more detailed block diagram of an active hybrid utilizing series-connected, frequency-dependent and voltage-controlled impedance elements to match the characteristic impedance of the connected telephone loop.

In FIG. 3 there is shown a detailed block diagram of an active hybrid circuit using series-connected Thevenin equivalent sources for realizing the characteristic impedance of the transmission line. Thus, the bidirectional transmission line 30 is connected through the active hybrid to a unidirectional receive line 31 and a unidirectional transmit line 32 through serially-connected, frequency-sensitive, voltage-controlled impedances 33, 37, 38 and 39, each equivalent to one-half of the characteristic impedance of transmission line 30. Amplifier 34 converts the unbalanced transmission signal on line 31 to a balanced signal for launching on transmission line 30. Signals received by transmission line 30 are transmitted through frequency-sensitive, voltage-controlled impedances 33 and 39 and combined additively in amplifier 35, the output of which is applied to differential amplifier 36. Signals on transmission line 31 are applied to the other input of differential amplifier 36 to provide at transmit line 32 a signal from which the transmitted signal has been removed.

Figure 4:
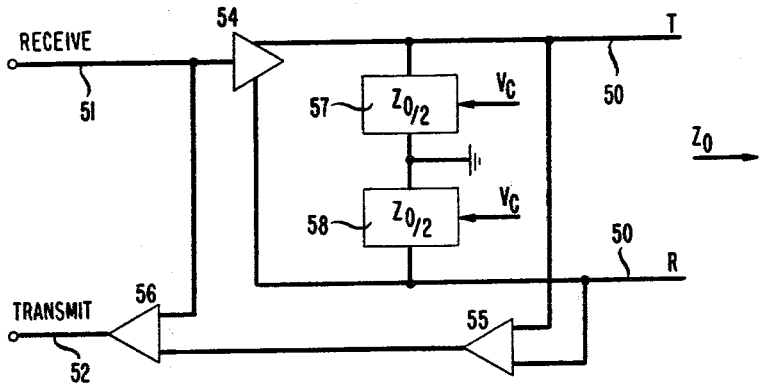
FIG. 4 is a more detailed block diagram of an active hybrid circuit utilizing shunt-connected, frequency-sensitive, voltage-controlled impedance elements for realizing the characteristic impedance of the connected telephone loop.

In FIG. 4 there is shown another form of active hybrid circuit for interconnecting a transmission line 50 with a unidirectional receive line 51 and a unidirectional transmit line 52. Again, the unbalanced received signal on line 51 is converted to a balanced signal in amplifier 54 and applied to transmission line 50. A pair of Norton equivalent frequency-sensitive, voltage-controlled impedances 57 and 58 are connected in shunt across transmission line 50. Signals received on transmission line 50 are applied through amplifier 55 to amplifier 56 where they are differentially combined with the signals on transmission line 51. The output of differential amplifier 56 appearing on transmit line 52 therefore includes only the signals received from a remote source via transmission line 50.

Figure 5:
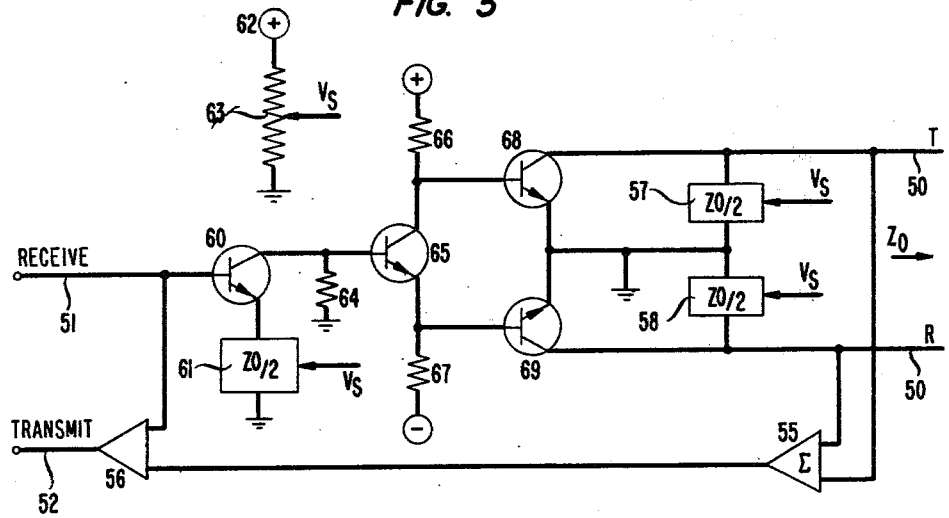
FIG. 5 is a more detailed circuit diagram of the active hybrid circuit shown in FIG. 4.

In FIG. 5 there is shown a more detailed circuit diagram of an electronic hybrid circuit utilizing shunt-connected variable impedances as shown in FIG. 4. Reference numerals in FIG. 5 are identical to those utilized in FIG. 4 for those elements which exactly correspond. In particular, the unidirectional receive line 51 and the unidirectional transmit line 52 are coupled to a bidirectional transmission line 50 by means of the hybrid circuit shown in the figure. Unidirectional receive line 51 is connected to the base electrode of a transistor 60 having a voltage-controlled impedance 61 connected in its emitter circuit. Impedance 61 matches the impedance of the line and is under the control of voltage $V_s$ which my be derived, as shown in FIG. 5, from a constant voltage source 62 by means of a variable resistance 63. The value of impedance 61 is equal to some multiple such as one-half of the characteristic impedance of transmission line 50 and provides an impedance value similar to that shown in FIG. 2. The collector of transistor 60 is grounded through a resistor 64 and is connected to the base of transistor 65. The collector-emitter path of transistor 65 is biased through resistors 66 and 67 and transforms the unbalanced signal applied to its base into a balanced signal which is applied to the bases of output transistors 68 and 69. The emitters of transistors 68 and 69 are connected to ground potential while the collectors are connected to the tip and ring conductors, respectively, of bidirectional transmission line 50. Connected between the tip and ring conductors of transmission line 50 are two voltage-controlled, frequency-sensitive impedances 57 and 58 having the same impedance values as impedance 61 and being under the same control voltage.

As shown in FIG. 4, the conductors of transmission line 50 are connected to a summing amplifier 55, the output of which is applied to one input of differential amplifier 56. The other input is taken from unidirectional receive line 51. The output of amplifier 56 comprises the received signal that is delivered to unidirectional transmit line 52.

Figure 6:
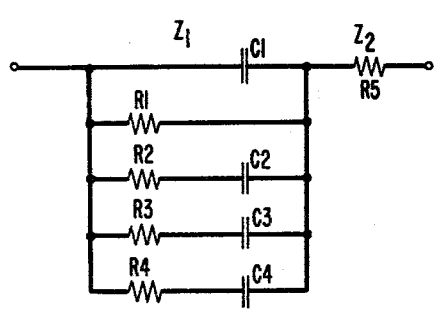
FIG. 6 is a resistive-capacitive network useful in realizing the characteristic impedances disclosed in FIG. 2.

In order to realize the frequency-sensitive impedances shown in FIGS. 3, 4 and 5, it is first recognized that realization in impedance poles rather than impedance zeros implies larger capacitor values and therefore the admittance form of realization has been adopted. One such frequency-sensitive impedance circuit is shown in FIG. 6, corresponding with a good approximation to the impedance of a 22-gauge twisted pair in a telephone cable. The component values for the capacitors and resistors of FIG. 6 are shown in Table I.

Table I

C1 = .04436μf
C2 = .12953μf
C3 = .050319μf
C4 = .049305μf

R1 = 1087.347 ohms
R2 = 459.679 ohms
R3 = 455.674 ohms
R4 = 44.868 ohms
R5 = 91.000 ohms An impedance with the desired value can, of course, be realized in either Foster form (series or shunt) or by a Cauer form of series and shunt elements.

The gauge-dependent characteristic impedance of a telephone pair can be characterized by an impedance of the form $$Z(N) = C_1(N)Z_1(\omega) + C_2(N)Z_2, \qquad (2)$$

where $Z_1$ corresponds to the low frequency behavior of the cable pair with an artifically-induced small conductance G and $Z_2$ is a conductance equal to 91 ohms which corresponds to the high frequency cable impedance. Both $Z_1$ and $Z_2$ can be realized as shown in FIG. 6. The quantities $C_1(N)$ and $C_2(N)$ are functions of the wire gauge N.

Figure 7:
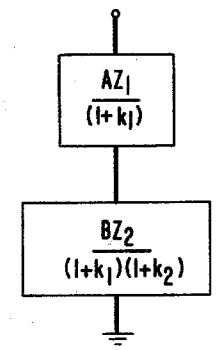
FIG. 7 is a general block diagram of frequency-sensitive impedance elements useful in realizing the characteristic impedances of FIG. 2.

A circuit to realize the relationships of equation (2) is shown in FIG. 7 where equation (2) is rewritten as:

$$Z(N) = AZ_1 \frac{(1 + k_1)}{(1 + k_1 + k_2)} + BZ_2 \frac{1}{(1 + k_1 + k_2)}, \qquad (3)$$

where $$C_1(N) = A \frac{(1 + k_1)}{(1 + k_1 + k_2)} \qquad (4)$$

and $$C_2(N) = B \frac{1}{(1 + k_1 + k_2)}, \qquad (5)$$

A and B being constants.

Figure 8:
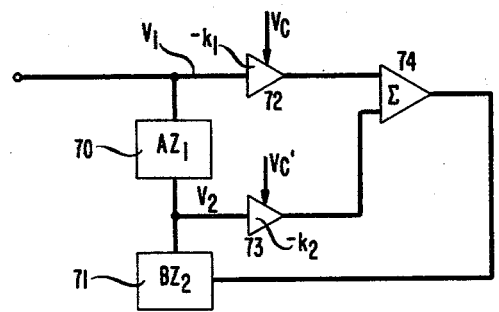
FIG. 8 is a more detailed block diagram of a 2-node Miller effect impedance mulitiplication circuit for realizing the impedance function shown in block form in FIG. 7.

The impedance function of equation (3) can be realized by a two-node Miller effect impedance multiplication circuit as shown in FIG. 8. This circuit can, of course, be generalized for any number of nodes. The constants A and B are chosen arbitrarily to match the parameters of a 26-gauge twisted pair with A being equal to 1.85 and B being equal to 1.25. With these values, the circuit of FIG. 8 will match a 26-gauge cabled pair when the values of the impedance multipliers $k_1$ and $k_2$ are equal to 0. The necessary values of $k_1$ and $k_2$ to match the various wire gauges currently in use, assuming the above values for the constants A and B, are shown in Table II.

Table II

| N  | $k_1$   | $k_2$  |
|----|---------|--------|
| 19 | −.6155  | .6317  |
| 22 | −.3243  | .5743  |
| 24 | −.1634  | .3539  |
| 26 | 0       | 0      |

The circuit of FIG. 8 comprises an RC impedance 70 and a resistive impedance 71 of the forms shown for $Z_1$ and $Z_2$, respectively, in FIG. 6. The input voltage $V_1$ across serially-connected impedances 70 and 71 is applied to a voltage multiplication circuit 72 having a multiplication factor under the control of control voltage $V_c$. The voltage at the midpoint of impedances 70 and 71 ($V_2$) is applied to a voltage multiplication circuit 73, likewise under the control of a control voltage $V_c$. The outputs of voltage multiplication circuits 72 and 73 are additively combined in summing circuit 74, the output of which is applied to the remaining terminal of impedance 71.

The required values of $k_1$ and $k_2$ can be realized by hyperbolic tangent functions of the control voltage $V_c$, where $$k_1 = -\tanh V_c \qquad (6)$$

and $$k_2 = 0.65 \tanh(3.701 V_c). \qquad (7)$$

Figure 9:
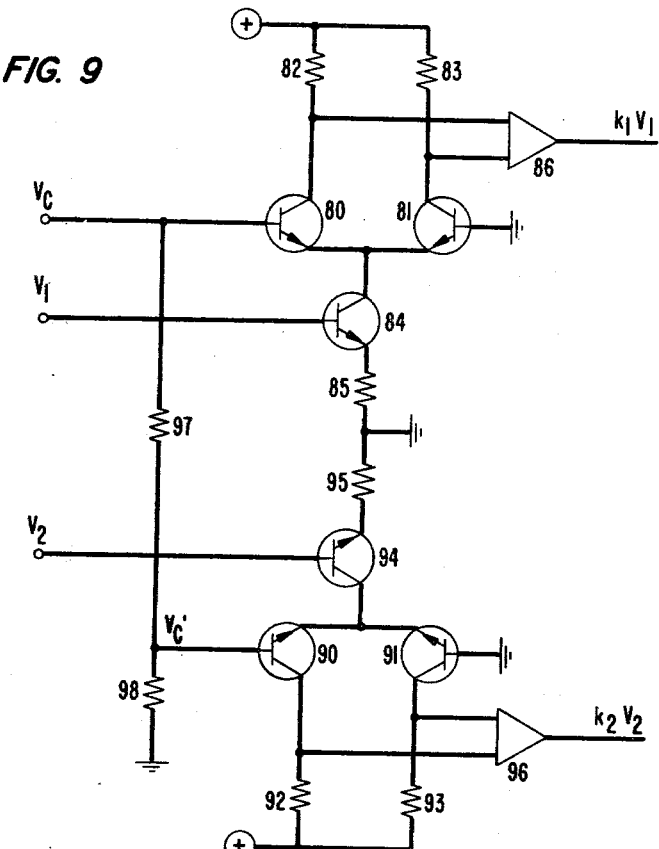
FIG. 9 is a detailed circuit diagram of a long-tailed pair realization of hyperbolic tangent impedance functions of the voltage-controlled variable gain amplifiers shown in FIG. 8.

The realization of the hyperbolic tangent functions can be accomplished with the use of a "long-tailed pair" as shown in FIG. 9.

In FIG. 9 there is shown the long-tailed pair realization of the hyperbolic tangent multipliers shown as elements 71 and 73 in FIG. 8. A first long-tailed pair comprising transistors 80 and 81 have their collector electrodes biased through resistors 82 and 83 and their emitter electrodes connected together to the collector of transistor 84. The emitter of transistor 84 is connected through resistor 85 to ground potential. The voltage $V_1$ from FIG. 8 is connected to the base of transistor 84. The base of transistor 81 is grounded while the base of transistor 80 is under the control of control voltage $V_c$. The voltage between the collector of transistor 80 and the collector of transistor 81 is the hyperbolic function and is connected to unit gain differential amplifier 86, the output of which comprises the hyperbolic tangent function $k_1 V_1$.

A similar long-tailed pair is used to realize the second voltage multiplier 73 in FIG. 8. This long-tailed pair comprises transistors 90 and 91, the collectors of which are biased through resistors 92 and 93, respectively. The emitters of transistors 90 and 91 are connected together to the collector of transistor 94, the emitter of which is connected through resistor 95 to ground potential. The voltage $V_2$ from FIG. 8 is supplied to the base of transistor 94 while the base of transistor 91 is grounded. The control voltage to the base of transistor 90 is derived from a voltage divider comprising resistors 97 and 98 to provide the voltage $V_c'$ equal to $1/3.701 \, V_c$ as required by equation (7). The voltage between the collectors of transistors 90 and 91 is inverted and applied to unit gain differential amplifier 96, the output of which is the hyperbolic tangent function $k_2V_2$.

The gain of each long-tailed pair through a unit gain differential amplifier is given by equation (8):

$$R_c/R_e \tanh(qX/2kT), \qquad (8) \text{ ps}$$

where X is the applied voltage, $R_c$ is the resistance in the collector circuits of transistors 80–81 or 90–91, $R_e$ is the resistance in the emitter circuit of transistor 84 or 94, q is the absolute charge of an electron, K is Boltzmann's constant and T is absolute temperature in degrees Kelvin. For the multiplier $k_1$ (pair 80–81), $R_c = R_e$ and $X = 2kT/qV_c$, while for $k_2$, $R_c = 0.65 R_e$ and $X = 3.701(2kT/q)$. The voltage $V_c$ can be derived as shown in FIG. 5 either by presetting the voltage divider with detents corresponding to the gauge of the connected cable or can be derived empirically by varying the tap on resistor 63 to minimize the overall reflection from the transmission line.

It will be noted that an active hybrid realized in accordance with FIG. 5 and the succeeding figures provides an impedance match to the transmission line 50 which is frequency-insensitive over an extremely broad range of frequencies and, moreover, which is adjustable for different gauges of wire in the telephone cable. The use of a Norton rather than a Thevenin equivalent source is a desirable design choice which minimizes the complexity of adapting the same source impedance to different wire gauges. Moreover, the voltages applied to this active hybrid are completely independent of frequency so that the destructive interference, upon which hybrid action depends, remains constant throughout the entire frequency range. The realization of FIG. 5, however, requires three shunt elements 57, 58 and 61 to ground, each of which involves the complicated element combinations of FIGS. 6 and 9.

Figure 10:
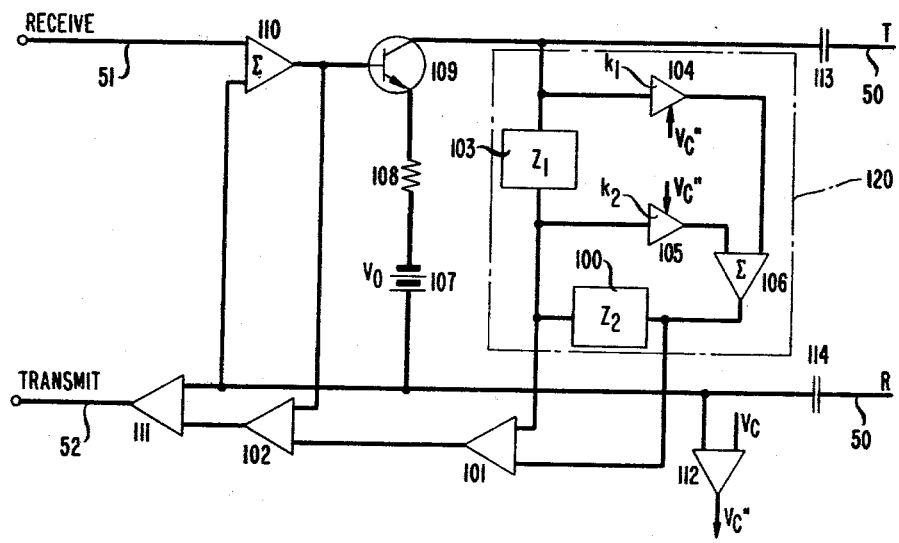
FIG. 10 is a detailed block diagram of a simplified active hybrid circuit in accordance with the present invention which employs a floating power supply and a single frequency-sensitive, voltage-controlled impedance.

One means of reducing complexity is shown in FIG. 10, using a floating power supply having a common voltage $V_o$ and a single frequency-dependent, voltage-controlled impedance network 120. Rather than supplying a frequency-independent voltage to the transmission line, this circuit transmits a frequency-independent current. This current is sensed across impedance element 100 by a differential amplifier 101, the output of which is supplied to differential amplifier 102. Impedance elements 100 and 103 correspond to impedances 71 and 70, respectively, in FIG. 8, connected in a two-node Miller effect impedance multiplying circuit using voltage multipliers 104 and 105. These voltage multipliers 104 and 105 are under the control of a control voltage $V_c''$, and are combined in summing amplifier 106, the output of which is applied to the right-hand end of impedance 100. The floating power supply represented by battery 107 is connected in series with a resistor 108 in the emitter circuit of transistor 109. The voltage supplied by battery 107 is combined with the signal on line 51 in combining amplifier 110 to provide the input signal to the base of transistor 109. This same signal from amplifier 110 is supplied to the remaining input of amplifier 102, the output of which is connected to differential amplifier 111. The output of amplifier 111 is the transmit signal delivered on line 52. The battery supply voltage $V_o$ from battery 107 is combined with the control voltage $V_c$ in combining amplifier 112 to provide the control voltage $V_c''$ for multipliers 104 and 105. This direct current supply voltage $V_o$ is isolated from bidirectional transmission line 50 by capacitors 113 and 114. Amplifiers 110, 111 and 112 serve the purpose of adding in or subtracting out the floating power supply voltage for voltages derived from and delivered to, respectively, circuits outside of the local common ground for the floating power supply 107.

It should be noted that a floating power supply is desirable in any application where the active elements of the hybrid must be energized at dc levels well below those existing on the transmission line and a dc-to-dc conversion is required anyway. Moreover, the additional differential amplifiers 110, 111 and 112 necessary for isolation and referencing of the hybrid are far less costly to implement than are the frequency-sensitive, voltage-controlled impedances which are required for the implementation of FIG. 5.

It should be further noted that the active hybrid of the present invention can be realized with Thevenin source equivalents if wire gauge adaptation is not required and if no problems arise in realizing the larger capacitor values required.

The electronic hybrids realized by the present invention are essentially independent of frequency since, as shown in FIG. 2, the low frequency impedance is accurately simulated for both frequency variations and wire gauge variations down to frequencies well below the effective band of operation. The high frequency impedance, on the other hand, is essentially constant for all higher frequency above this lower band. The extremely broad band performance of the hybrids of the present invention may make them suitable for broadband signaling such as is required in high speed digital transmission. These hybrids may therefore be used in a high speed digital transmission system operating over standard twisted pairs available in the existing telephone network.

What is claimed is:

1. A hybrid balancing impedance for a telephone cable pair characterized by
    a low frequency noninductive resistive-capacitive networkk effective to provide an impedance function inversely proportional to the square root of frequency at low frequencies, and
    a high frequency nonreactive resistive network effective to provide a constant impedance function at high frequencies.

2. The balancing impedance according to claim 1 characterized in that
    said impedances take the form $$Z(N) = C_1(N)Z_1(\omega) + C_2(N)Z_2,$$

where Z is the impedance of said load, $Z_1$ is the impedance of said low frequency network, $Z_2$ is the impedance of said high frequency network, and $C_1$ and $C_2$ are functions of the gauge N of said telephone cable pairs.

3. The balancing impedance according to claim 2 characterized in that
    said functions of wire gauge are realized with two-node Miller effect multipliers connected to said low and high frequency impedances.

4. The balancing impedance according to claim 3 characterized in that
said multipliers each comprise a long-tailed pair having one multiplier related to the gauge of said telephone cable pairs.

5. The balancing impedance according to claim 1 characterized in that
said low frequency network comprises a capacitance, a resistance and a plurality of serially connected resistance-capacitance legs, all connected in parallel.

6. An impedance synthesis circuit comprising
a first and a second impedance connected in series and each providing a different frequency characteristic in a different frequency range,
a first multiplier connected to one end of said first impedance,
a second multiplier connected to the midpoint of said first and second impedances,
means for summing the outputs of said first and second multipliers and applying the sum to the remaining end of said second impedance, and
linearly related multiplier control signals connected to said multipliers.

7. The impedance synthesis circuit according to claim 6 wherein said first impedance provides an impedance function inversely proportional to the square root of frequency in the low frequency range.

8. The impedance synthesis circuit according to claim 6 wherein said second impedance provides a constant impedance function in the high frequency range.

9. The impedance synthesis circuit according to claim 6 wherein said multiplier control signals are related to a parameter of a connected transmission line.

* * * * *